(12) United States Patent
James

(10) Patent No.: US 10,207,616 B2
(45) Date of Patent: Feb. 19, 2019

(54) HEADREST ASSEMBLY WITH MIRROR

(71) Applicant: Toyota Motor Engineering & Manufacturing North America, Inc., Erlanger, KY (US)

(72) Inventor: Kevin J. James, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 15/244,442

(22) Filed: Aug. 23, 2016

(65) Prior Publication Data

US 2018/0056831 A1   Mar. 1, 2018

(51) Int. Cl.
*B60N 2/879* (2018.01)
*B60N 2/809* (2018.01)
(Continued)

(52) U.S. Cl.
CPC ............. *B60N 2/879* (2018.02); *B60N 2/806* (2018.02); *B60N 2/809* (2018.02); *B60N 2/838* (2018.02); *B60N 2/882* (2018.02)

(58) Field of Classification Search
CPC ...... B60N 2/4879; B60N 2/809; B60N 2/806; B60N 2/882
(Continued)

(56) References Cited

U.S. PATENT DOCUMENTS 2,765,840 A * 10/1956 Robert .................. B60N 2/4879
297/403
4,247,961 A * 2/1981 Masch .................. A47G 9/1045
297/397
(Continued)

FOREIGN PATENT DOCUMENTS

CN 202847577 U 4/2013
DE 3637772 A1 * 5/1988 ........... B60N 2/4876
(Continued)

OTHER PUBLICATIONS iPADKET, Dec. 2, 2012, [retrieved Jan. 29, 2015] retrieved from the Internet: <http://www.amazon.com/iPADKET-DURABLE-Headrest-Airplane-Holder/dp/B004FDF0YO>, 1 page.
Duragadget Large In-Car Headrest Mount/Holder/Support with Adjustable Arms for Acoustic Solutions 10-inch Portable DVD Player, [retrieved Jan. 28, 2015] retrieved from the Internet: <http://guide.alibaba.com/shop/duragadget-large-in-car-headrest-mount-holder-support-with-adjustable-arms-for-acoustic-solutions-10-inch-portable-dvd-player_4876983.html>, 3 pages.
(Continued)

*Primary Examiner* — Milton Nelson, Jr.
(74) *Attorney, Agent, or Firm* — Christopher G. Darrow; Darrow Mustafa PC

(57) ABSTRACT

A seat assembly for a rear vehicle cabin is provided including a seat base configured to receive and support a car seat in a rear-facing configuration; a backrest; and a movable headrest component. The movable headrest component includes first and second opposing major surfaces. At least a portion of the second major surface is configured to provide a reflective surface, for example, using a mirror. A movable cover may be provided, configured to selectively conceal the reflective surface. The movable headrest component has a first orientation with the first major surface facing a forward direction with respect to the vehicle, and a second orientation with the second major surface facing a forward direction with respect to the vehicle. In the second orientation, the reflective surface provides a forward facing driver with a view of the car seat, when viewed from a center mounted rear-view mirror coupled to a vehicle windshield.

3 Claims, 8 Drawing Sheets

(51) Int. Cl.
*B60N 2/806* (2018.01)
*B60N 2/882* (2018.01)
*B60N 2/838* (2018.01)

(58) Field of Classification Search
USPC ............... 297/410, 399, 400, 408, 185, 397
See application file for complete search history.

(56) References Cited

U.S. PATENT DOCUMENTS

| | | | |
|---|---|---|---|
| 5,850,954 A | 12/1998 | Dong-Joo | |
| 6,203,104 B1 * | 3/2001 | Matsuo | B60N 2/3013 297/188.1 |
| 6,779,900 B1 | 8/2004 | Nolan-Brown | |
| 6,913,364 B2 | 7/2005 | Kane | |
| 7,303,237 B1 * | 12/2007 | Hughes | B60N 2/4879 297/181 |
| 7,862,189 B1 | 1/2011 | Freese | |
| 8,794,700 B2 | 8/2014 | Brawner | |
| 2004/0086259 A1 | 5/2004 | Schedivy | |
| 2011/0227387 A1 * | 9/2011 | Kolich | B60N 2/4802 297/408 |
| 2012/0097831 A1 | 4/2012 | Olukotun et al. | |
| 2013/0107449 A1 | 5/2013 | Su et al. | |
| 2013/0119727 A1 | 5/2013 | Lavelle et al. | |
| 2013/0181492 A1 | 7/2013 | Prescott et al. | |
| 2013/0259261 A1 | 10/2013 | Mitchell | |
| 2014/0001217 A1 | 1/2014 | Jolda et al. | |
| 2014/0084648 A1 | 3/2014 | Wen et al. | |
| 2014/0268544 A1 | 9/2014 | Johnson | |
| 2015/0313367 A1 | 11/2015 | Grooters et al. | |
| 2016/0221484 A1 * | 8/2016 | Abro | B60R 11/0235 |

FOREIGN PATENT DOCUMENTS

| | | | | |
|---|---|---|---|---|
| EP | 1610978 | B1 | 6/2011 | |
| FR | 2850335 | A1 * | 7/2004 | ............... B60N 2/28 |
| JP | 2003116661 | A * | 4/2003 | |
| KR | 097036870 | A1 * | 7/1997 | |
| WO | WO-8600509 | A1 * | 1/1986 | ............. B60N 2/879 |

OTHER PUBLICATIONS

SmartLogic PerfectMatch Headrest System (8GB), [retrieved Jan. 28, 2015] retrieved from the Internet: <http://www.vizualogic.com/products/perfectmatch-headrests-players/smartlogic-perfectmatch-headrest-system-8gb.html>, 1 page.

WebMD Baby's First Year Community: Question about dvd player for rear-facing carseat, [retrieved Jan. 28, 2015] retrieved from the Internet: <http://forums.webmd.com/3/newborn-and-baby-exchange/forum/8547>, 3 pages.

New Android Tablet Headrest Monitors from Vizualogic, Published May 30, 2013, retrieved from the Internet: <https://www.youtube.com/watch?v=OfkJr_dc2To>, retrieved Jan. 15, 2016 (2 pages).

Imagination Productions Inc. U.S.A, "Original iPADKET Headrest Mount for iPad", retrieved from the Internet: <http://www.ipadket.com/ipadket-original.html>, retrieved Jan. 15, 2016 (3 pages).

* cited by examiner

HEADREST ASSEMBLY WITH MIRROR

TECHNICAL FIELD

The present disclosure relates generally to a vehicle headrest assembly, and more specifically, to a movable headrest with a reflective or mirrored portion to provide selective viewing of an infant sitting in a rearward facing infant car seat to a forward-facing front passenger.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Various laws, codes, regulations, and ordinances may govern the transportation of infants and young children within a vehicle. In many instances, young children must generally travel in the rear portion of a vehicle cabin until they reach a certain age, height, and/or weight. Infants and toddlers may further be required to sit in an appropriate infant car seat or booster seat. For safety reasons, it may be necessary for certain infant car seats to be installed in the rear cabin in a manner such that they are facing the rearward direction of the vehicle. Such a rearward facing position may obstruct the monitoring of the infant by a forward-facing front passenger, and in particular, by a driver of the vehicle. This may create anxiety for the forward-facing front passenger. In the event aftermarket mirrors are temporarily tied to a portion of a seat or other area of a cabin interior, in an attempt to provide a better view of the infant to a forward facing front passenger, such aftermarket mirrors may pose certain safety issues based on their location and/or mode of attachment.

Accordingly, there remains a need for an improved viewing system that provides a forward-facing front passenger, such as driver of the vehicle, with the ability to have at least a partial view of a rearward facing infant.

SUMMARY

This section provides a general summary of the disclosure, and is not a comprehensive disclosure of its full scope or all of its features.

In various aspects, the present teachings provide a headrest assembly for a vehicle. The headrest assembly may include a movable headrest component, having a first major surface and a second major surface opposite the first major surface. At least a portion of the second major surface provides a reflective surface. The movable headrest component has a first orientation with the first major surface generally facing a forward direction with respect to the vehicle, and a second orientation with the second major surface generally facing a forward direction with respect to the vehicle. The movable headrest assembly may include a movable cover configured to selectively conceal the reflective surface.

In other aspects, the present teachings provide a rear vehicle seat assembly including a backrest and a movable headrest component. The movable headrest component includes a first major surface, and a second major surface opposite the first major surface. At least a portion of the second major surface provides a reflective surface. The movable headrest component has a first orientation with the first major surface generally facing a forward direction with respect to the vehicle, and a second orientation with the second major surface generally facing a forward direction with respect to the vehicle. The movable headrest component may further include a mounting portion having at least one mounting post extending from the mounting portion into an engaging portion defined in the backrest.

In still other aspects, the present teachings provide a seat assembly for a rear cabin of a vehicle including a seat base configured to receive and support a car seat in a rear-facing configuration; a backrest; and a movable headrest component. The movable headrest includes a first major surface and a second major surface opposite the first major surface. At least a portion of the second major surface is configured to provide a reflective surface, for example, a mirror. A movable cover may be provided, configured to selectively conceal the reflective surface. The movable headrest component has a first orientation with the first major surface facing a forward direction with respect to the vehicle, and a second orientation with the second major surface facing a forward direction with respect to the vehicle. In the second orientation, the reflective surface provides a forward facing driver with a view of the car seat, when viewed from a center mounted rear-view mirror coupled to a vehicle windshield.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a seat assembly for a rear seat of a vehicle. The seat assembly is provided including a seat base configured to receive and support an infant car seat in a rear-facing configuration; a backrest; and a movable headrest component. The movable headrest component includes a first major surface and a second major surface opposite the first major surface. At least a portion of the second major surface is configured to provide a reflective surface, for example, a mirror. The movable headrest component has a first orientation with the first major surface facing a forward direction with respect to the vehicle, and a second orientation with the second major surface facing a forward direction with respect to the vehicle. In the second orientation, the reflective surface provides a forward-facing front driver with a view of the car seat, when viewed from a center mounted rear-view mirror coupled to a vehicle windshield. The movable headrest component may be manually removed from the backrest and switched between the first and second configurations, or, in other aspects, the movable headrest component is rotatable between the first and second configurations.

Figure 1:
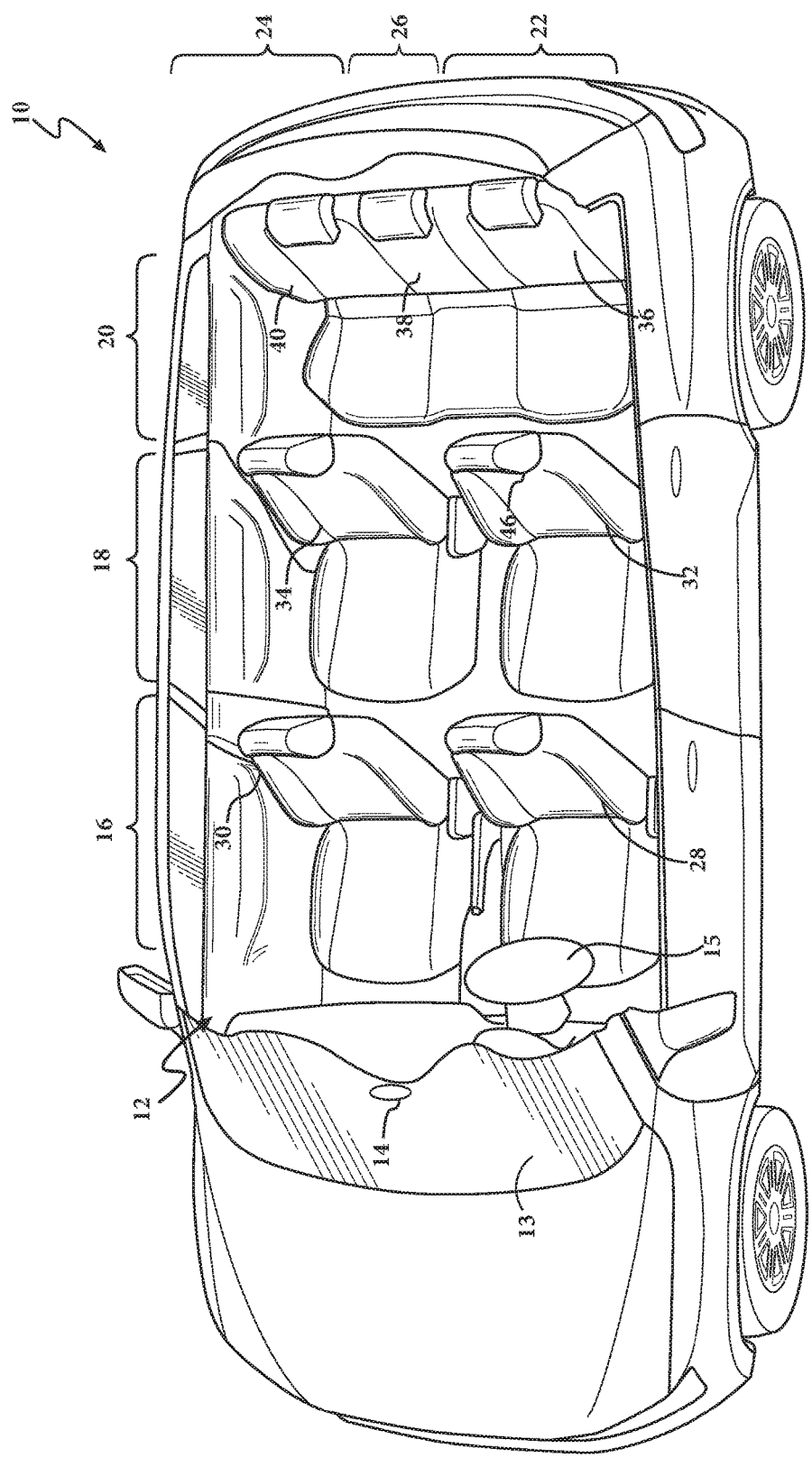
FIG. 1 is a cut-away, perspective, top-plan view of an exemplary vehicle useful with the teachings of the present disclosure.

FIG. 1 provides a cut-away, perspective top-plan view of an exemplary vehicle 10. The vehicle 10 defines an interior cabin 12 with a windshield 13 having a rear-view mirror 14 for use by a forward-facing front driver to view rearward traffic as well as the rear portion of the vehicle cabin 12. For discussion purposes, the interior cabin 12 of the vehicle 10 can be divided into several sections, both laterally and longitudinally, based on a location respective to a steering wheel 15. For example, as shown, the interior cabin 12 can be divided laterally into a first row 16, a second row 18, and optionally a third row 20. Additionally, the interior cabin 12 can be divided longitudinally into a driver's side 22, a passenger's side 24, and optionally a center region 26. Thus, each region or section of the interior cabin 10 can be referred to herein by its respective lateral and longitudinal descriptors. For example, the section directly behind the driver's seat can be referred to as the second row 18 driver's side 22 seat 32.

Each section can include at least one seat. It should be understood that although the exemplary vehicle 10 is specifically provided with three rows 16, 18, 20, the present technology is applicable with vehicles having two or more rows, and the seats may be located in various positions of the rear cabin. As is known in the art, certain seats may be designed for individual seating, while other seats may be configured as benches or rows with multiple seating areas. In the example of FIG. 1, there are two seats 28, 30 in the first row 16, two seats 32, 34 in the second row 18, and three seating areas 36, 38, 40 having a common bench base in the third row 20. Thus, in this example, there are at least five positions where a rear-facing passenger, such as an infant or toddler, could be seated within an appropriate car seat: the second row 18 driver's side 22 (seat 32); the third row 20 driver's side 22 (seat 36); the second row 18 passenger's side 24 (seat 34); the third row 20 center 26 (seat 38); and the third row 20 passenger's side 24 (seat 40). Other seating configurations are also possible.

Figure 2:
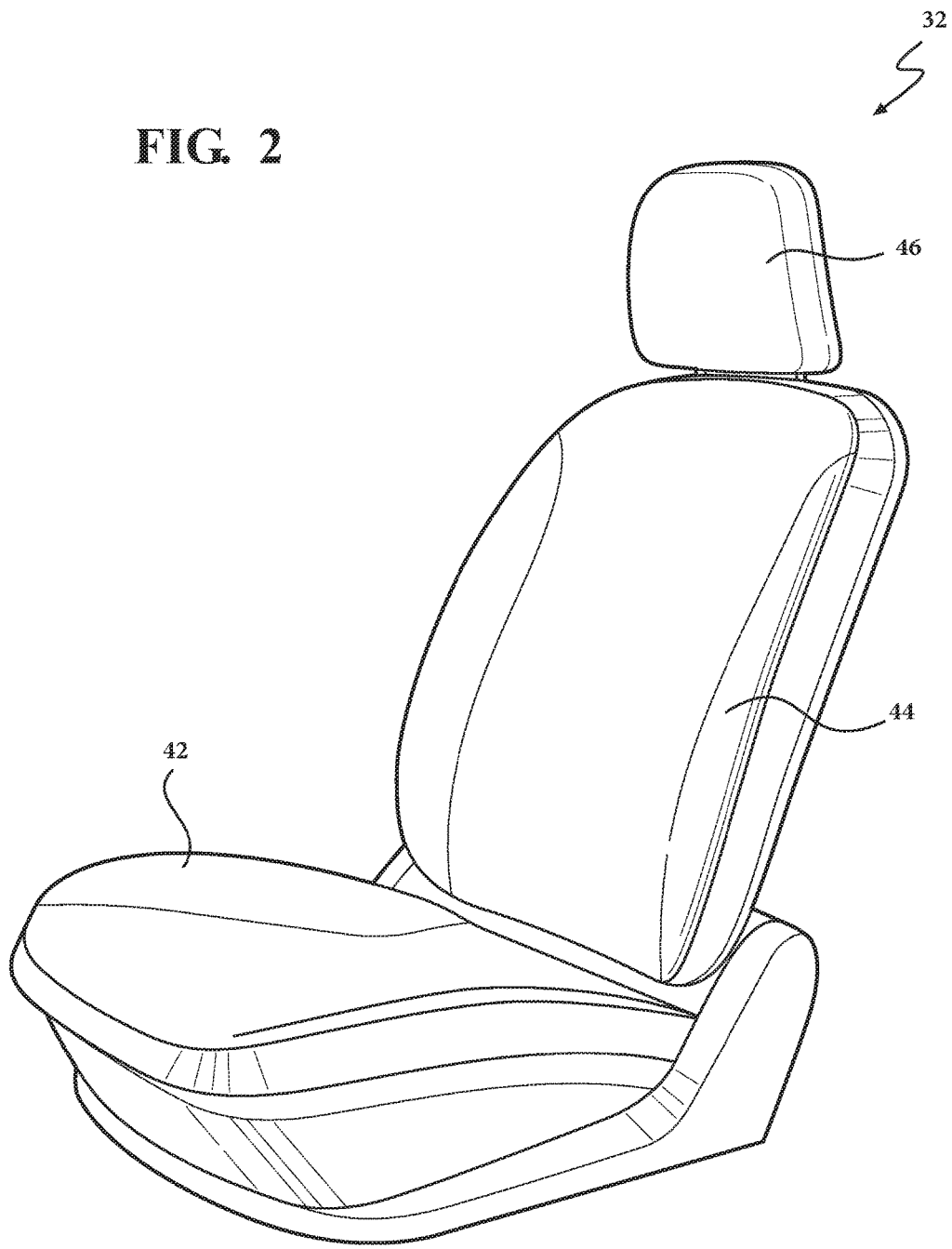
FIG. 2 is a perspective view of a second row bucket-type seat as provided in the vehicle of FIG. 1.

Referring now to FIG. 2, a perspective view of the second row 18 driver's side 22 bucket-style seat 32 is illustrated. The seat 32 can include a base seating area 42, a backrest 44, and a movable headrest component 46. The base 42 can be configured to support, for example, a passenger, an infant car seat, groceries, or any other objects that can be safely located on a seat 32. The backrest 44 can be configured to support a passenger's upper body in a comfortable position when seated in a forward-facing orientation.

In various aspects, and as discussed in more detail below, the movable headrest component 46 may be rotatable or detachable for changing its orientation. In this regard, the headrest component 46 may be mountable both in a first, forward-facing orientation, and a second, rearward-facing orientation on the backrest. In the first, or forward-facing orientation, the movable headrest component 46 can be configured to support a passenger's head and neck as a safety restraint when the passenger is seated in a forward-facing direction. In the second, or rearward-facing orientation, a reflective surface on the headrest component 46 may be exposed, enabling a forward-facing front driver with a view of an infant in a car seat, when viewed from a center mounted rear-view mirror coupled to a vehicle windshield.

Figure 3:
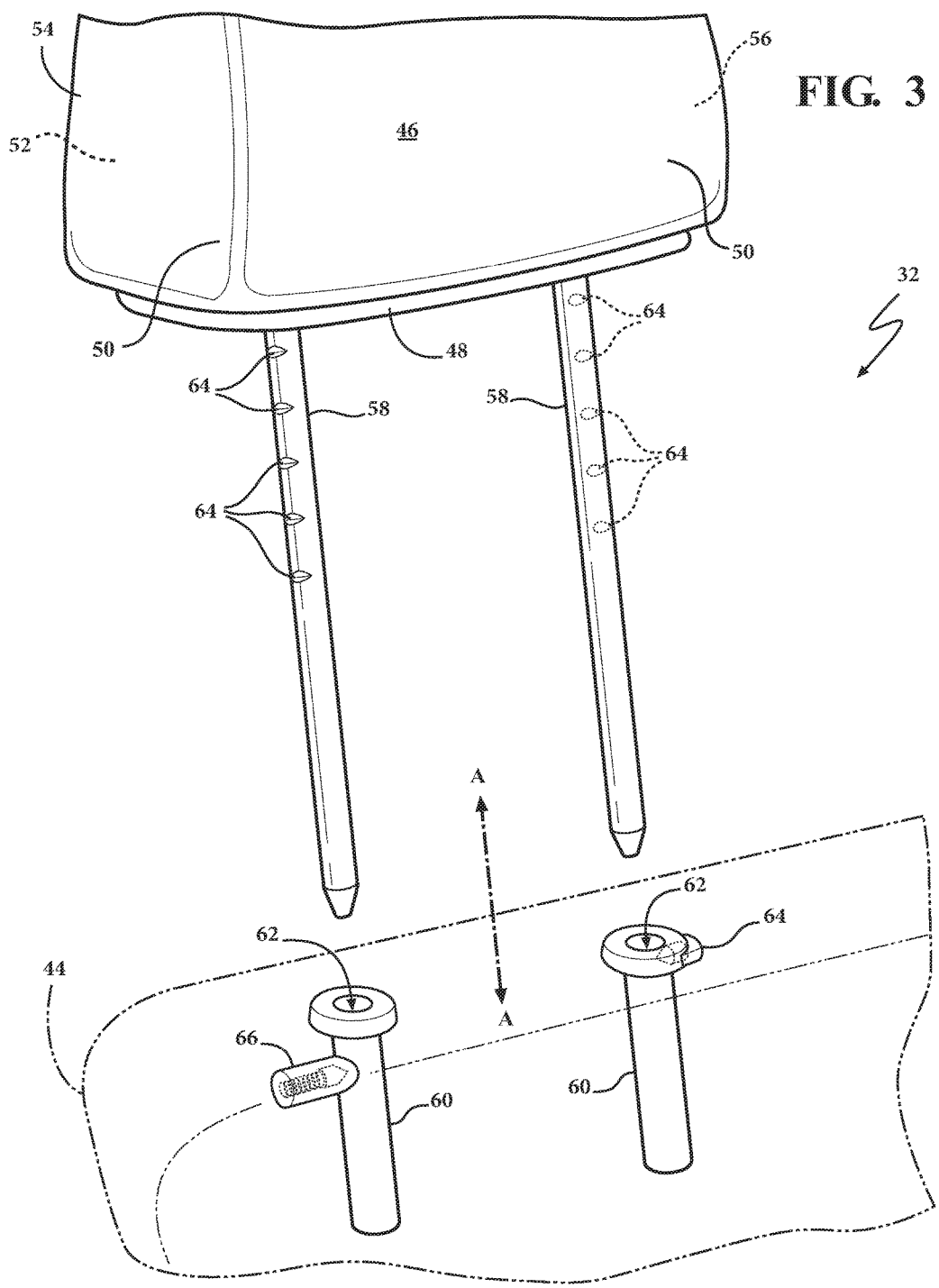
FIG. 3 is a partial exploded front perspective view of an exemplary headrest assembly of the seat of FIG. 2 according to one aspect of the present disclosure.

Referring now to FIG. 3, a partial exploded view of the headrest assembly of the second row seat 32 is illustrated. The movable headrest component 46 can include a bottom region, or bottom mounting portion 48, a first major surface 50, a second major surface 52 opposite the first major surface 50, and opposing sides 54, 56. The bottom mounting portion 48 can be configured to support the movable headrest component 46 in a fixed position. The bottom mounting portion 48 can include at least one post 58 extending from the movable headrest component 46 in order to attach the movable headrest 46 component to the backrest portion 44 of the seat 32. FIG. 3 shows the mounting portion 48 having two posts 58. The two posts 58 in this example can be mechanically aligned and selectively inserted into engaging portions 60 in an upper portion of the backrest 44 of the seat 32. In one example, the posts 58 can pass through openings 62 defined in the engaging portions 60 and lock into place when at least one notch 64 on the surface of each post 58 is engaged by a locking mechanism, such as a spring arm 66, positioned with the respective engaging portions 60. The spring arms 66 can be disengaged from the respective notches 64 via a release button 68. Here, a single release button 68 is shown, though other locking and unlocking mechanisms are also possible.

The first major surface 50 of the headrest 30 can include a cushioned portion configured to serve as a head restraint for the rear seat passenger. The cushioned portion can be comprised of any one of a stiff foam, softer foam, gel, feathers, or any other known means of forming a cushioned surface for use in supporting and restraining a passenger's head and neck. When a passenger is seated on the seat 32 in a front-facing position, the first major surface 50 of the movable headrest component 46 can face forward relative to the interior cabin 12 of the vehicle 10, that is, the movable headrest component 46 can have a forward-facing orientation. In this configuration, the head and neck of the passenger may be supported both for comfort and safety reasons while the passenger is seated.

In various aspects, the movable headrest component 46, including the mounting portion 48, can be symmetrical along an axis A-A. The headrest 46, in being symmetrical about the axis A-A, can be mounted both in the forward-facing orientation described above and a rearward-facing orientation relative to the interior of the vehicle 10. For example, when the movable headrest component 46 is positioned on the second row 18 driver's side 22 seat 32, the first major surface 50 of the movable headrest component 46 can face the first row 16 in the forward-facing orientation. Alternatively, the second major surface 52 of the movable headrest component 46 can be positioned to face the first row 16, this being consistent with the rearward-facing orientation for the movable headrest component 46.

Figure 4:
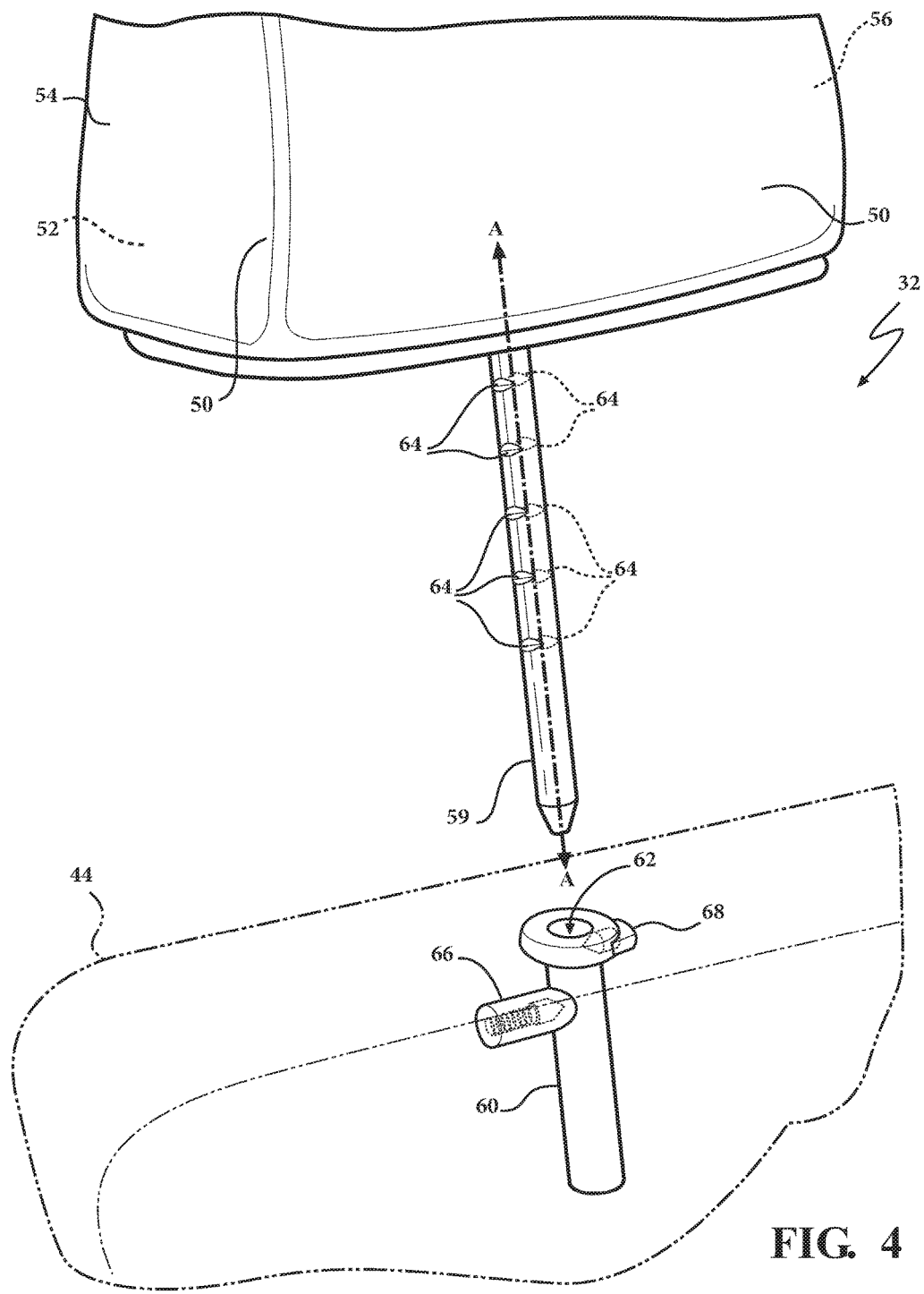
FIG. 4 is a partial exploded front perspective view of an exemplary headrest assembly of the seat of FIG. 2 according to another aspect of the present disclosure.

Referring now to FIG. 4, a partial exploded view of another aspect of the movable headrest component 46 is shown. The movable headrest component 46 similarly includes the mounting portion 48, the first major surface 50, and the second major surface 52. In this example, the mounting portion 48 includes a single post 59. The single post 59 similarly passes through the opening 62 defined in the engaging portion 60 in order to attach the movable headrest component 46 to the upper backrest portion 44 of the seat 32. A keyhole or suitable anti-rotation mechanism (not shown) may be provided such that the movable headrest component 46 does not rotate with respect to the seatback 44. Alternatively, the post 59 and anti-rotation mechanism can be designed such that the movable headrest component 46 can selectively rotate between the first, forward-facing orientation, and the second, rearward-facing orientation, optionally locking in place between the two orientations. In still other aspects, the post 59 may be oval or non-circular to prevent unwanted rotation. The movable headrest component 46, including the mounting portion 48, may be symmetrical about the A-A axis, allowing the movable headrest component 46 to be inserted into the backrest 44 of the seat 32 both in the forward-facing orientation and the rearward-facing orientation.

The movable headrest component 46 may be selectively mounted to the backrest 44 by inserting the single post 59 into the opening 62 of the engaging portion 60 of the backrest 44 of the seat 32. The at least one notch 64 on the surface of the single post 59 may be engaged by the spring arm 66. The spring arm 66 may be disengaged from the at least one notch 64 and the movable headrest component 46 removed when the release button 68 is selected. Any means of mounting the movable headrest component 46 known in the art is contemplated in the present disclosure, so long as the movable headrest component 46 is capable of being mounted both in the forward-facing orientation and the rearward-facing orientation.

Figure 5:
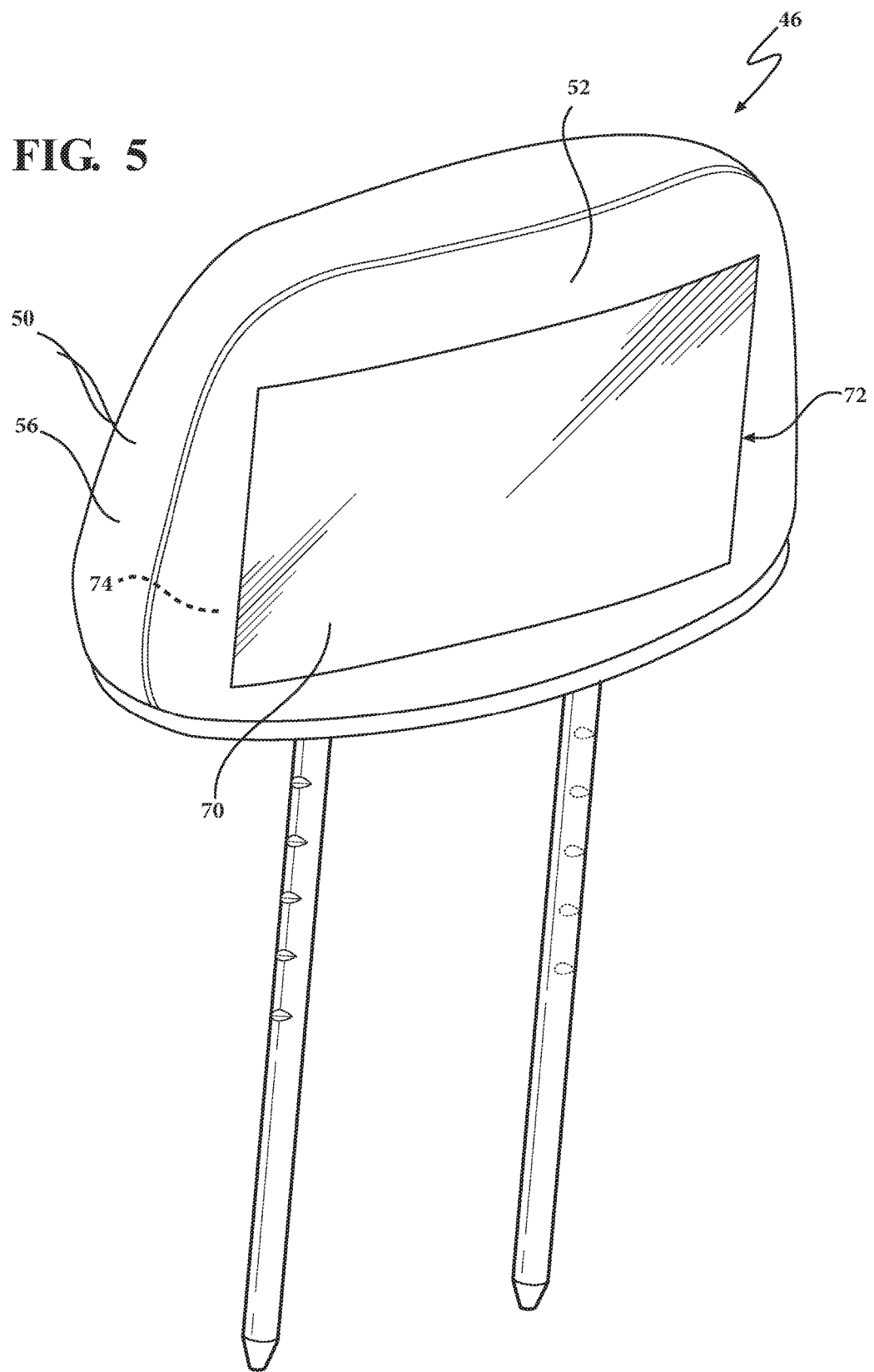
FIG. 5 is a rear perspective view of an exemplary headrest assembly that may be used with the seat of FIG. 2 according to one aspect of the present disclosure.

Referring now to FIG. 5, a rear perspective view of one exemplary aspect of the movable headrest component 46 of FIG. 3 is shown. The second major surface 52 of the movable headrest component 46 generally opposes the first major surface 50. The second major surface 52 may be substantially flat, and in certain aspects, may have a slight curvature. A reflective surface 70 is provided on at least a portion of the second major surface 52. In various aspects, the reflective surface 70 may be integrated with what is commonly referred to as a mirror 72, such as a plastic, non-breakable, light reflecting object. For example, the mirror 72 may be a plane mirror, that is, a mirror with a flat, planar, reflective surface 70. In another aspect, the mirror 72 may be a curved mirror, that is, a mirror with a curved reflective surface 70. The curved reflective surface 70 may be either convex (outwardly curved) or concave (inwardly curved), depending on the desired field of view. Generally, a convex reflecting surface will provide a wider field of view, which may be desirable with the present technology.

It should be noted that the concave or convex reflecting surface may also be coupled with or attached to a clear plastic or glass cover, preferably non-breakable, and the cover may be substantially planar. It is also envisioned that the reflective surface 70 may be a reflective sheet or a reflective film coupled to the second major surface 52.

Figure 6:
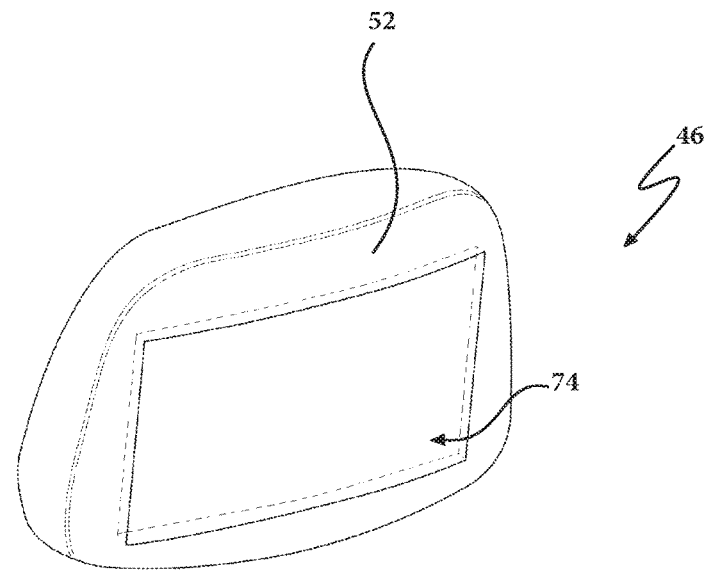
FIG. 6 is a rear perspective view of the movable headrest component of FIG. 5 defining a cavity for a mirror.

In various aspects, and depending on the size and thickness, the mirror 72 can be disposed with a cavity 74 defined in the headrest 46, as best shown in FIG. 6. In this regard, the mirror 72 may be substantially flush with the second major surface 52, or may be slightly recessed, as may be desired. In other aspects, the mirror 72 may be coupled to the second major surface 52 of the headrest 46 via any adhesive, fasteners, stitching, stapling, or any other means of bonding.

Figure 7:
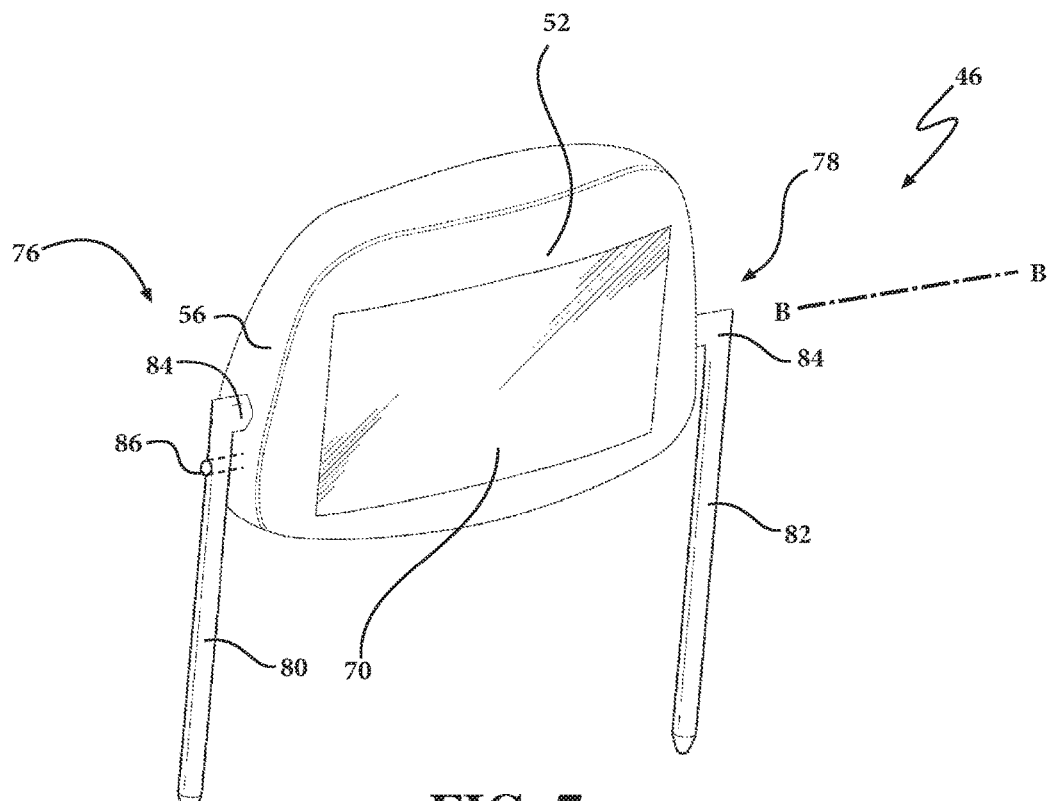
FIG. 7 is rear perspective view of an exemplary headrest assembly of the seat of FIG. 2 according to yet another aspect of the present disclosure.

Referring now to FIG. 7, a rear perspective view of an exemplary headrest assembly of the seat of FIG. 2 according to yet another aspect of the present disclosure is illustrated. In this aspect, the movable headrest component 46 is rotatable between the first and second orientations. In this regard, it is envisioned that the movable headrest component 46 is configured to rotate along B-B axis, for example, up to about 180 degrees between the first orientation and the second orientation.

The movable headrest component 46 can include a first major surface 50, a second major surface 52 opposite the first major surface 50, and opposing side mounting portions 76, 78. Two posts 80, 82 are provided, connected with a substantially horizontally aligned center member 84. The posts 80, 82 and center member 84 may be separate components, or may be a unitary design. Similar to the aspects shown in FIGS. 3 and 4, the posts 80, 82 extend from the movable headrest component 46 and attach to the backrest portion 44 of the seat 32. For example, the two posts 80, 82 in this example can be mechanically aligned and selectively inserted into engaging portions in an upper portion of the backrest of the seat, as discussed above. In one example, at least one of the side mounting portions 76, 78 may include a limiting mechanism, such as a locking pin 86, configured to selectively restrict rotational movement of the headrest component.

Figure 8:
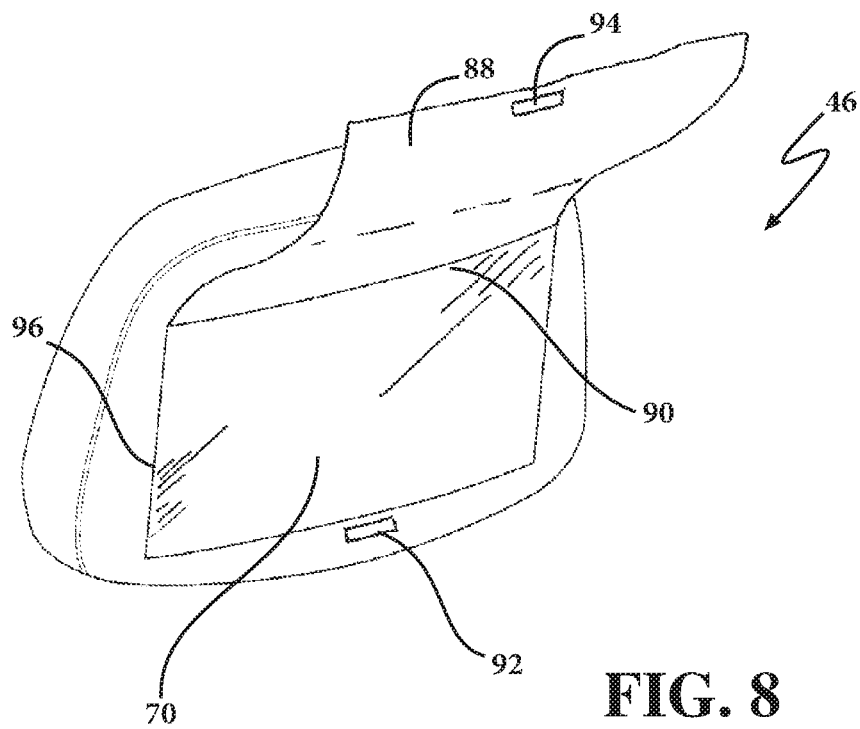
FIG. 8 is a rear perspective view of an exemplary movable headrest component including a flexible flap movable cover.

For various reasons, it may not be desirable to have a reflective surface on a headrest facing the rearward direction of the vehicle. For example, it may be detrimental for an oncoming vehicle to be faced with a reflection of its headlamps. Accordingly, in various aspects, the present disclosure additionally provides a movable cover that may be configured to selectively conceal the reflective surface. FIG. 8 is a rear perspective view of an exemplary movable headrest component 46 including a flexible flap movable cover 88. By way of example, the cover 88 may be a fabric, textile, leather, plastic, or other material sufficient in thickness or density such that it blocks reflective light. As shown in one example, the flexible cover 88 may be fixedly secured to an upper portion 90 adjacent the reflective surface 70, and removably secured to a bottom portion, for example, with respective hook and loop closure components 92, 94. Other connections or fastening means may also be used, such as complementary magnets, buttons, snaps, etc. The flexible cover 88 can simply be folded over the headrest component 46 when it is desired to expose the reflective surface 70. In other aspects (not shown) the flexible cover 88 may be coupled or secured to a side portion 96 adjacent the reflective surface, and can be moved when it is desired to expose the reflective surface 70. In certain aspects, the flexible cover 88 can be removed completely. In still other aspects, a cover may be provided that may be placed over the entire movable headrest component 46.

Figure 9:
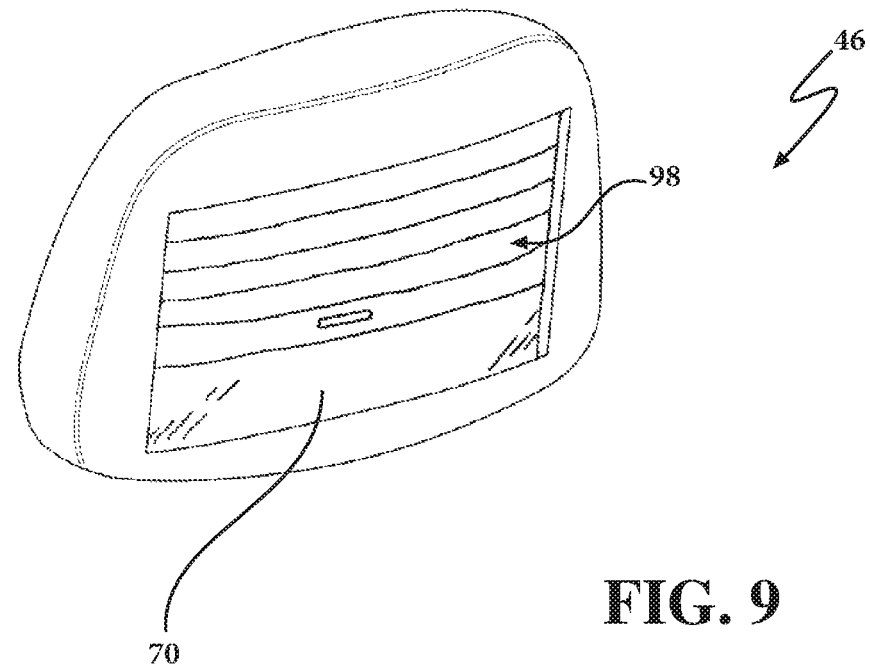
FIG. 9 is a rear perspective view of an exemplary movable headrest component including a sliding panel movable cover.

FIG. 9 is a rear perspective view of an exemplary movable headrest component including a sliding panel movable cover 98. By way of example, the sliding panel movable cover 98 may include a plurality of rollers or shutters, or it may be single flexible panel. As shown, the cover 98 is configured to move in an up/down configuration. In other aspects, the cover 98 may be configured to move in a side-to-side configuration. Similarly, the cover 98 may be a fabric, textile, leather, plastic, or other material sufficient in thickness or density such that it blocks reflective light.

Figure 10:
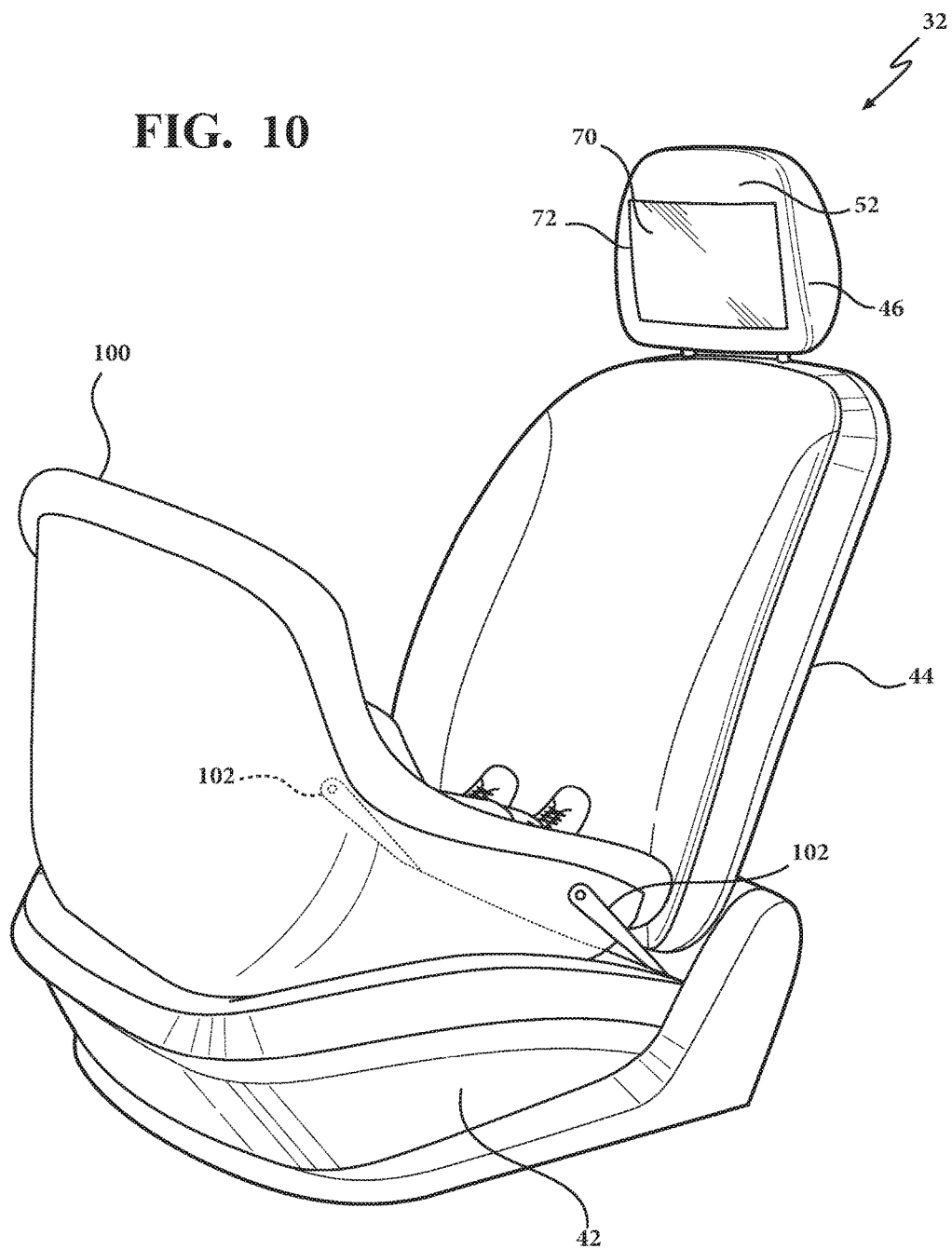
FIG. 10 is a perspective view of the seat of FIG. 2 including the headrest of FIG. 5 in the second orientation, and with a seat base supporting an infant car seat in a fear-facing configuration.

Referring now to FIG. 10, a perspective view of the seat 32 of FIG. 2 including the movable headrest component 46 and an infant car seat 100 in a rear-facing orientation is shown. As discussed above, the seat 32 may include the base 42, the backrest 44, and the movable headrest component 46. The movable headrest component 46 can have a forward-facing orientation and a rearward-facing orientation. The forward-facing orientation can be designed for the first side 50 to face forward, relative to the orientation of the seat 32 within the vehicle 10. The rearward-facing orientation can be designed for the second side 52 of the movable headrest component 46 to face forward relative to orientation of the seat 46. As shown in FIG. 10, the movable headrest 46 is mounted in the rearward-facing orientation, whereas in FIG. 2, the movable headrest component 46 is mounted in the forward-facing orientation.

The seat 32 of FIG. 10 includes the infant car seat 100 mounted on the seat base 42. The rearward-facing orientation of the movable headrest component 46 is such that the reflective surface 70 of the headrest 46 faces the infant in the rear-facing car seat 100. By way of example, the car seat 100 can be secured to the base 42 of the seat 32 using anchors 102 positioned on opposing sides of the car seat 100. When a rearward-facing infant is occupying the car seat 100, he or she can be viewed in the reflective surface 70 from the driver's rear-view mirror 14 mounted on the windshield 13.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A seat assembly for a rear cabin of a vehicle, the seat assembly comprising:
    a seat base configured to receive and support a car seat in a rear-facing configuration;
    a backrest;
    a removable and reversibly mountable headrest component, comprising:
        a first major surface comprising a cushioned portion configured to serve as a head restraint for a rear seat passenger;
        a second major surface opposite the first major surface;
        a cavity defined in at least a portion of the second major surface;
        a mirror disposed within the cavity and configured to provide a reflective surface such that the reflective surface is substantially flush with the second major surface;
        a mounting portion;
        at least one mounting post extending from the mounting portion into an engaging portion defined in the backrest; and
        a movable cover configured to selectively conceal the reflective surface,
    wherein the removable and reversibly mountable headrest component has a first orientation with the first major surface generally facing a forward direction with respect to the vehicle, and a second orientation with the second major surface generally facing a forward direction with respect to the vehicle.

2. The seat assembly according to claim 1, wherein the headrest component defines first and second opposing side surfaces, each side surface defines a side mounting portion configured to rotatably couple with a respective mounting post, and the headrest component is configured to rotate on an axis up to about 180 degrees between the first orientation and the second orientation.

3. The seat assembly according to claim 1, wherein the headrest component is configured to raise and lower with respect to the backrest.

* * * * *